J. S. OTIS.
ONE-WAY VALVE.
APPLICATION FILED NOV. 9, 1912.

1,093,465.

Patented Apr. 14, 1914.

Witnesses:
Alda Miller
Frank J. Kent

James S. Otis
Inventor
By his Attorney Augustus M. Henry

UNITED STATES PATENT OFFICE.

JAMES S. OTIS, OF NEW YORK, N. Y., ASSIGNOR, BY MESNE ASSIGNMENTS, TO HAZEL K. OTIS, OF NEW YORK, N. Y.

ONE-WAY VALVE.

1,093,465. Specification of Letters Patent. Patented Apr. 14, 1914.

Application filed November 9, 1912. Serial No. 730,513.

*To all whom it may concern:*

Be it known that I, JAMES S. OTIS, a resident of New York, in the county of New York and State of New York, (whose post-office address is No. 1 Madison avenue, New York city, New York,) have invented certain new and useful Improvements in One-Way Valves, of which the following is a specification.

My invention relates broadly to trap devices, and more particularly to that type of valve adapted to permit the passage of fluid therethrough in one direction but to prevent the passage of fluid therethrough in the reverse direction.

The embodiment of my invention disclosed herein aims more particularly to provide a trap device which is capacitated for advantageous utilization when connected to the return side of a radiator included within a steam-heating system.

One of the objects of my invention is to provide a trap device of the above type adapted to completely isolate its supporting radiator from connection with any other radiator in the system through the return mains or return risers or the like within the system; thereby to prevent undesirable entry into such supporting radiator of fluid which has previously been discharged by some other radiator within said system, to prevent chattering or hammering in said system adjacent said supporting radiator on account of the presence of water of condensation, and to permit said system to be operated successfully at so much lower pressures than has been possible heretofore that the provision of vacuum or other pumps or the like in connection therewith will not be necessary.

Still another object is to provide such a trap device that is capable of inexpensive manufacture, ready attachment, compactness and accuracy of construction, and preferably provided within a single casing with independent one-way valves for fluids of dissimilar characteristics, as, for example, steam and water.

Other objects and aims of the invention, together with the advantages inherent, will be in part obvious and in part specifically referred to in the course of the following description of the elements, combinations, arrangements of parts, and applications of principles constituting the invention; and the scope of protection contemplated will appear from the claims.

Figure 1:
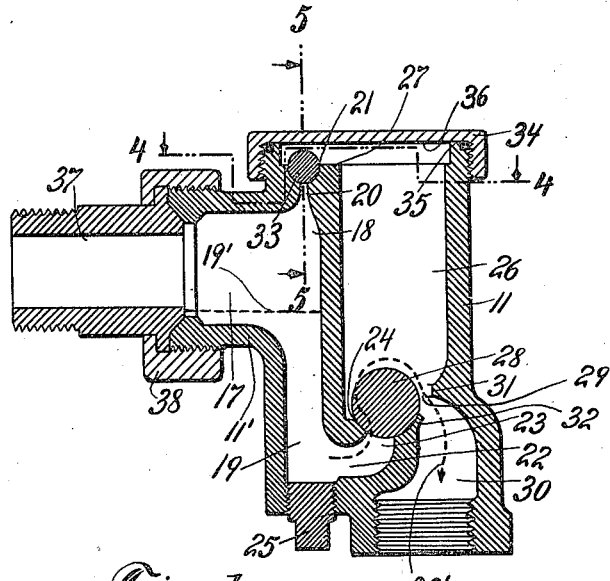
Figure 2:
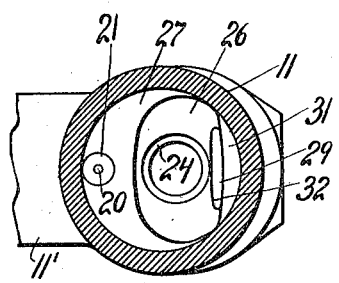

In the accompanying drawings, which are to be taken as a part of this specification, and in which I have shown a possible embodiment of my invention:—Figure 1 is a vertical sectional view, taken through said embodiment; Fig. 2 is a sectional view, partly broken away, taken on the line 4—4 of Fig. 1 and looking in the direction of the arrows; and Fig. 3 is a similar view, taken on the line 5—5 of Fig. 1 and looking in the direction of the arrows.

Similar reference characters refer to similar parts throughout the several views of the drawing.

Figure 3:
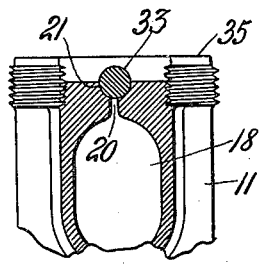

Attention is now directed to Figs. 1, 2 and 3, wherein are illustrated the details of construction of a preferred form of trap-device. The trap-device is provided, as shown, with an inlet port 17, which branches into an upwardly-extending passage 18 and a downwardly-extending passage 19; passage 18 terminating in an aperture 20 leading into a valve-seat 21, and passage 19 finally extending upwardly as at 22 and terminating in an aperture 23 leading into another valve-seat 24. A threaded plug 25 is preferably utilized, as indicated in Fig. 1, in connection with said inlet-port 17. The trap-device carries interiorly a chamber 26, above the mouth of which, as most clearly shown in Figs. 1 and 2, is a shelf-formation 27; and disposed within said shelf-formation as indicated is the valve-seat 21. At the bottom of chamber 26 is the valve-seat 24, adapted to accommodate the ball 28. Arranged as shown there is an egress-channel 29, leading from said chamber into an exit-port 30, the latter preferably interiorly threaded as shown.

It may be remarked in passing that ball 28 is preferably constructed of material having a greater specific gravity than water, whereby fluid within chamber 26 may never be sufficient to cause the ball 28 to float, or to become displaced from its valve-seat 24. It is thus clear that ball 28, preferably constructed as aforesaid, is normally and by the action of gravity caused to seat itself and remain seated within its valve-seat 24, closing the aperture in said valve-seat, despite the presence of any fluid which may by backflow have entered the trap through exit-port 30. This gravimetric quality of said ball 28 should preferably not be sufficient, however, to resist the proper passage, indicated by the dotted line 30', of "head"-urged fluid through said valve-seat; and attention is now directed to an important function of the passages 19 and 22, i. e., to generate a hydrodynamic "head," effective, at the proper times, or when the water-level 19' in passage 19 becomes dangerously adjacent the lower bore-level within a connection 37 between a trap and its adjacent radiator, to displace said ball 28 from its seat 24. As will be observed from an examination of Fig. 1, these passages 19 and 22 constitute in combination a U-tube, the mouth of one branch of said tube being in effect at the valve-seat 24 and the mouth of the other branch of said tube being in effect coincident with the dotted-line 19'. This dotted-line, it will be noticed, substantially represents the maximum head of water which, in this embodiment of my invention, may be maintained without backflow into the adjacent radiator; it being understood that each trap is disposed for purposes of draining preferably below its radiator.

With the water-level in one branch of the U-tube (here the passage 19, Fig. 1) higher than the water-level in the other (here the passage 22, said figure), it is obvious that one of the problems in connection with the present embodiment resolved itself into designing a U-tube such that the head created by the differential fluid-levels would be sufficient to raise from its seat a ball 28, (the latter being of too high a specific gravity, however, for any flotation in any volume of fluid possible within chamber 26), whenever the actual water-level 19', which is of course continually being raised during operation of the system, approximately equals the indicated water-level 19'. I have conducted many experiments in this connection and have had unfavorable results with metallic balls, which are too heavy to be actuated by a convenient "head" of the above nature, and with wooden balls, which are of too great floatability. I have secured satisfactory results by using a ball made of a particular composition, preferably conformed under great pressure; of which compositions and modes of compressions there are a variety commonly known and used. In Fig. 1, I have drawn approximately to scale a sectional view of an actual working model which I have had constructed of this embodiment of my invention, and, with the U-tube arranged as indicated and with the "fluid" hereinbefore mentioned consisting of water, I have found that a ball 28 having a specific gravity ten per cent. greater than water was incapable of normal flotation within chamber 26, and at the same time, that a "head" as indicated in said figure, was sufficient to force said ball from its valve-seat for the passage of fluid from the afore-described U-tube into the chamber.

Referring again to the formation of upper lip 31 of the mouth-like aperture 29 (Figs. 1 and 2), it will be seen that this lip formation in this embodiment acts as an aid, first, in guiding ball 28, whenever displaced, always to settle by gravity into its valve-seat 24, and also, second, even during the residence of said ball within said seat, in discharging fluid from chamber 26 into exit-port 30.

Within valve-seat 21, located in the shelf-formation 27, is another ball 33. A cap-piece 34 is adapted to be screwed home as shown; and attention is directed to a projecting annulus 35 or the like (Figs. 1 and 3) provided above the exterior threads shown in said figures, which permits the cap-piece to be screwed tightly home as aforesaid, and yet maintains it always spaced away from ball 33 at a predetermined distance. It should here be noted also that the gravimetric character of said ball 33 should be similar, with reference to the quality of non-floatability, to that of ball 28; for it is conceivable that under certain circumstances enough fluid to cause a portion thereof to lie above the shelf-formation 27 could by backflow enter the chamber 26. And if this occurred, it would tend to cause said ball 33 to float above its seat 21 and thereby allow fluid to backflow into the passage 18; although it is probable, of course, that a fortuitous air compression adjacent said valve-seat might prevent encroachment onto said shelf-formation of any fluid or backflow.

In connection with the parts just described, I have illustrated in Fig. 1 a form of connection for communicating with the inlet port 17 of said trap device. Inlet port 17, as shown, lies primarily within a branch-portion 11', which is exteriorly threaded. A connection 37 is shown as coupled to such branch-portion by an interiorly-threaded ring-nut 38. An understanding of the operation of this embodiment of my invention, in connection with a system including its supporting radiator, will most clearly be possible if I describe the method of operation of the form of trap-device which I have disclosed. The supporting radiator preferably communicates at its return end with the interior of the trap-device as by means of the connection 37, the exit-port 30 leading into a suitable return pipe. Upon water of condensation accumulating within the radiator, it passes through the connection 37, traverses the inlet-port 17, and drops by gravity into the passage or leg 19, thence as the collection of water of condensation in the leg 19 is increased creating a water-seal in the U-tube and below the ball 28. When this water rises to the level of the line 19', the head of water in the leg 19, together with the steam pressure in the radiator acting on the surface of the water at 19', is sufficient to lift the ball 28. As the water falls in the leg 19, a correspondingly greater pressure within the radiator is required to coöperate with said head in order to lift the ball 28; until the water reaches a certain level between the line 19' and the level at which the water-seal in the leg 19 will be broken, at which certain level a radiator pressure sufficient to lift the comparatively light ball 33 is not sufficient to lift the ball 28. Water of condensation, when sufficiently accumulated, will be forced past the ball 28 and into the chamber 26; and yet, pending said accumulation, any radiator pressure which might otherwise fling about the water to cause "chattering" may conveniently pass the ball 33, by unseating the same, and freely enter the chamber 26. The operation just described is of course dependent upon a construction wherein the leg 19, apertures 20 and 23, and balls 28 and 33 are given the certain necessary relative proportions. It will be clear, on the other hand, that any steam or water of condensation endeavoring to pass from the return pipe into a radiator through the trap-device carried by said radiator, will be prevented from passing through said trap-device, the water of condensation by the ball 28 (for the said ball is, as aforesaid, not buoyant) and steam or air by the ball 33.

Particular attention is directed to the aforementioned predetermined distance between the top of the ball 33 and the smooth under-surface of the cap-piece 34. This is deemed preferable and distinctly advantageous and making for efficiency, as it prevents any possibility of the ball 33 so disposing itself that it would not normally reseek its seat, thereby tending to render the device unreliable and apt to become suddenly and frequently inoperative.

My invention provides a novel means of controlling the steam admission into a radiator or the like from the outlet-port thereof, preventing uncontrolled backflow of either steam or water of condensation into a radiator which it is desired shall not radiate heat, a difficulty which has been due to the fact that steam and water passing from a radiator into a return main or the like have, by vacuum, differential pressures, or other action, been drawn into another radiator, to heat the same, through said last-mentioned radiator's exit-port. By providing in connection with the outlet-port of each radiator in a heating system one of the trap-devices illustrated in the drawings, it is obvious that a small quantity of pipes and pipe-connections is required, for by the previously-described operation of the trap-device, all steam and water of condensation admitted into a particular radiator by means of its inlet-valve passes eventually into the return main through its adjacent trap-device and thereafter cannot enter either this particular radiator or any other radiator in the system which is provided with such a trap-device at its exit-port; because each such trap-device acts as a positive check to the backflow therethrough of any appreciable quantity of either water, steam or air. And by virtue of this construction also, it will be seen that the utilization of a fan, blower or exhaust or vacuum apparatus, for maintaining a proper conduction in said return main, is not necessary or desirable, because the contained fluids will by condensation or gravity descend for subsequent discharge from the system.

It will be noted also that, aside from its other advantages, the system just discussed may be maintained efficient at an exceedingly low pressure, since there is no resistance or opposed action from steam or the like within the return connections and main.

It is to be understood that materials, sizes, and relations of parts are unimportant except as called for by the claims. Furthermore, the disclosures made in the drawings and specification as to the application of the disclosed embodiment of my invention to a heating system are in nowise to be taken as limiting said invention, but merely as illustrative thereof; and the claims are meant to comprehend all the new and useful inventions herein disclosed.

Having described my invention, what I claim as new and desire to secure by Letters Patent, is:

1. A device for the purpose described, including a shell having an inlet, an outlet, a valve-seat located within said shell, a ball adapted normally to be accommodated within said valve-seat, an interior passage communicating with said inlet and with said valve-seat, a second valve-seat located within said shell at a higher level than the first-mentioned valve-seat, a ball adapted normally to be accommodated within said second valve-seat, and a second interior passage communicating with said inlet and with said second valve-seat, the only means of communication between said inlet and said outlet interiorly of said shell being provided by way of either one of said valve-seats.

2. A device for the purpose described, including a shell having an inlet, an outlet, a valve-seat located within said shell, a ball adapted normally to be accommodated within said valve-seat, an interior passage bent upon itself to constitute a vertically arranged U-tube, one leg of said U-tube communicating directly with said inlet and the other leg of said U-tube communicating directly with said valve-seat, a second valve-seat located within said shell and at a higher level than the first-mentioned valve-seat, a ball normally adapted to be accommodated within said second valve-seat, and an upwardly extending interior passage communicating with said inlet and with said second valve-seat, the only means of communication between said inlet and said outlet interiorly of said shell being provided by way of either one of said valve seats.

3. A device for the purpose described, including a shell having an inlet, an outlet, an interior chamber, a valve-seat located within said chamber, a ball adapted normally to be accommodated within said valve-seat, a vertically arranged interior passage communicating with said inlet and with said valve-seat, a second valve-seat located within said shell and at a higher level than the first-mentioned valve-seat, a ball adapted normally to be accommodated within said second valve-seat, an upwardly extending interior passage communicating with said inlet and with said second valve-seat, a passage communicating with said first-mentioned chamber and said outlet, the only means of communication between said inlet and said outlet interiorly of said shell being provided by way of the last-mentioned passage and by way of either one of said valve-seats, and means adapted to cause each of said balls to seek its proper valve-seat and prevent it from entering the valve-seat of the other ball.

4. A device for the purpose described, including a shell having an inlet, an outlet, an interior chamber, a valve-seat located within said chamber, a ball adapted normally to be accommodated within said valve-seat, said ball being heavier than a volume of water equal to the volume of the ball, an interior passage bent upon itself to constitute a vertically arranged U-tube, one leg of said U-tube communicating directly with said inlet and the other leg of said U-tube communicating directly with said valve-seat, a second valve-seat located within said shell and at a higher level than the first-mentioned valve-seat, a ball adapted normally to be accommodated within said second valve-seat, an upwardly extending interior passage communicating with said inlet and with said second-mentioned valve-seat, and a passage communicating with said first-mentioned chamber and said outlet, the only means of communication between said inlet and said outlet interiorly of said shell being provided by way of the last-mentioned passage and by way of either one of said valve-seats.

5. A device for the purpose described, including a shell having an inlet, an outlet, an interior chamber, a valve-seat located within said chamber, a ball adapted normally to be accommodated within said valve-seat, a vertically arranged interior passage communicating with said inlet and with said valve-seat, a second valve-seat located within said shell and at a higher level than the first-mentioned valve-seat, a ball adapted normally to be accommodated within said second valve-seat, an upwardly extending interior passage communicating with said inlet and with said second valve-seat, a passage communicating with said first-mentioned chamber and said outlet, the only means of communication between said inlet and said outlet interiorly of said shell being provided by way of the last-mentioned passage and by way of either one of said valve-seats, and a device carried interiorly of said chamber adapted to guide the first-mentioned ball to become seated in the first-mentioned valve-seat and to clear said last-mentioned passage.

6. A device for the purpose described, including a shell having an inlet, an outlet, an interior chamber, a valve-seat located within said chamber, a ball adapted normally to be accommodated within said valve-seat, a vertically arranged interior passage communicating with said inlet and with said valve-seat, a second valve-seat located within said chamber, said second valve-seat being higher than the first-mentioned valve-seat, a ball adapted normally to be accommodated within said second valve-seat, an upwardly extending interior passage communicating with said inlet and with said second valve-seat, a cap-piece adapted to be carried by said shell and adapted to permit of a predetermined displacement of the second-mentioned ball from said second valve-seat but to prevent the displacement of the first-mentioned ball into said second valve-seat, and an aperture located in said chamber and communicating with said outlet, the only means of communication between said inlet and said outlet interiorly of said shell being provided by way of said aperture and by way of either one of said valve-seats.

7. A device for the purpose described, including a shell having an inlet, an outlet, an interior chamber, a valve-seat located within said chamber, a ball adapted normally to be accommodated within said valve-seat, a vertically arranged interior passage communicating with said inlet and with said valve-seat, a second valve-seat located within said shell at a higher level than the first-seats, the dimensions of the two lrst-mentioned valve-seat, a ball adapted normally to be accommodated within said second valve-seat, and an upwardly extending interior passage communicating with said inlet and with said second valve-seat, and a passage communicating with said first-mentioned chamber and said outlet, the only means of communication between said inlet and said outlet interiorly of said shell being provided by way of the last-mentioned passage and by way of either one of said valve-seats, the dimensions of the two first-mentioned passages being such that steam or air entering said device through said inlet will act to displace the second-mentioned ball from its valve-seat before acting to displace the first-mentioned ball from its valve-seat.

In testimony whereof, I have hereunto signed my name in the presence of two witnesses.

JAMES S. OTIS.

Witnesses:
A. M. HENRY,
J. M. CONATY.